United States Patent
Talius et al.

(10) Patent No.: US 9,805,104 B2
(45) Date of Patent: Oct. 31, 2017

(54) RECOVERY POINT OBJECTIVE ENFORCEMENT

(71) Applicant: Microsoft Technology Licensing, LLC, Redmond, WA (US)

(72) Inventors: Tomas Talius, Redmond, WA (US); Alexander Nosov, Redmond, WA (US); Satyanarayana Narlapuram, Redmond, WA (US); Robin D. Dhamankar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 13/768,539

(22) Filed: Feb. 15, 2013

(65) Prior Publication Data

US 2014/0236891 A1    Aug. 21, 2014

(51) Int. Cl.
| | |
|---|---|
| *G06F 17/30* | (2006.01) |
| *G06F 11/00* | (2006.01) |
| *G06F 11/20* | (2006.01) |
| *G06F 11/30* | (2006.01) |

(52) U.S. Cl.
CPC ........ *G06F 17/30575* (2013.01); *G06F 11/00* (2013.01); *G06F 11/202* (2013.01); *G06F 11/2038* (2013.01); *G06F 11/2048* (2013.01); *G06F 11/2097* (2013.01); *G06F 11/3006* (2013.01); *G06F 11/3055* (2013.01)

(58) Field of Classification Search
CPC ......... G06F 17/30578; G06F 17/30067; H04L 29/0854
USPC ......... 707/100, 613, 610, 639, 762; 711/162
See application file for complete search history.

(56) References Cited

U.S. PATENT DOCUMENTS

| | | | |
|---|---|---|---|
| 6,351,753 B1 * | 2/2002 | Jagadish | G06F 17/30356 |
| 7,231,455 B2 * | 6/2007 | Marejka | H04L 47/22 709/230 |
| 7,257,689 B1 * | 8/2007 | Baird | 711/162 |
| 7,395,352 B1 * | 7/2008 | Lam | H04L 67/1095 707/999.202 |
| 7,769,722 B1 * | 8/2010 | Bergant | G06F 11/2097 707/681 |
| 7,861,111 B2 | 12/2010 | Doerr | |
| 8,261,122 B1 | 9/2012 | Kappel et al. | |
| 8,364,685 B2 * | 1/2013 | Yahia et al. | 707/748 |
| 8,566,278 B2 * | 10/2013 | Crescenti et al. | 707/610 |
| 8,635,238 B2 * | 1/2014 | Tisi et al. | 707/762 |

(Continued)

OTHER PUBLICATIONS

Wood, et al., "PipeCloud: Using Causality to Overcome Speed-of-Light Delays in Cloud-Based Disaster Recovery", Retrieved at <<http://www.research.att.com/techdocs/TD_100498.pdf>>, 2nd ACM Symposium on Cloud Computing. ACM, Retrieved Date: Oct. 26, 2011, pp. 13.

*Primary Examiner* — Jeffrey A Burke
*Assistant Examiner* — Thong Vu
(74) *Attorney, Agent, or Firm* — Cooper Legal Group, LLC (57) ABSTRACT

A maximum lag between data stores can be specified that corresponds to a recovery point objective defined in a service level agreement. Lag can be monitored during a data replication between a primary data store and a secondary data store located in geographically different regions. Activity on the primary data store including incoming data transactions can be throttled as a function of the lag and the maximum lag.

20 Claims, 6 Drawing Sheets

(56) References Cited

U.S. PATENT DOCUMENTS

| | | | |
|---|---|---|---|
| 8,745,004 B1* | 6/2014 | Natanzon et al. | 707/639 |
| 9,135,064 B2* | 9/2015 | Dinker | G06F 9/4881 |
| 9,384,254 B2* | 7/2016 | Tekade | G06F 17/30581 |
| 2002/0120697 A1* | 8/2002 | Generous | H04L 29/06 709/206 |
| 2003/0145179 A1* | 7/2003 | Gabber et al. | 711/162 |
| 2005/0044088 A1* | 2/2005 | Lindsay et al. | 707/100 |
| 2005/0203908 A1* | 9/2005 | Lam | H04L 41/0893 |
| 2008/0209258 A1 | 8/2008 | Casale et al. | |
| 2008/0270523 A1* | 10/2008 | Parmar | G06F 9/5038 709/203 |
| 2008/0270692 A1* | 10/2008 | Cochran et al. | 711/114 |
| 2009/0265352 A1* | 10/2009 | Holenstein | G06F 17/30359 |
| 2009/0313311 A1* | 12/2009 | Hoffmann | G06F 11/2094 |
| 2010/0017647 A1* | 1/2010 | Callaway | G06F 11/1641 714/4.12 |
| 2010/0106538 A1 | 4/2010 | Routray et al. | |
| 2010/0191884 A1* | 7/2010 | Holenstein | G06F 11/2094 710/200 |
| 2010/0250733 A1* | 9/2010 | Turanyi | H04L 47/10 709/224 |
| 2011/0258630 A1* | 10/2011 | Fee | G06F 9/4843 718/101 |
| 2012/0054533 A1* | 3/2012 | Shi et al. | 714/4.1 |
| 2012/0089726 A1* | 4/2012 | Doddavula | H04L 67/34 709/224 |
| 2012/0117422 A1 | 5/2012 | Radhakrishnan | |
| 2012/0123999 A1 | 5/2012 | Ashutosh et al. | |
| 2012/0166390 A1* | 6/2012 | Merriman et al. | 707/613 |
| 2013/0262678 A1* | 10/2013 | Tung | G06F 9/5072 709/226 |
| 2013/0339297 A1* | 12/2013 | Chen | G06F 17/30581 707/624 |
| 2014/0181016 A1* | 6/2014 | Whitehead et al. | 707/613 |

\* cited by examiner

RECOVERY POINT OBJECTIVE ENFORCEMENT

BACKGROUND

Cloud computing refers to the use of computing resources including hardware and software that are delivered as a service over a network such as the Internet. Cloud service providers operate data centers that host customer databases and applications. Customers of a cloud service provider build services for their customers on top of this infrastructure. Some of those services are mission critical. That is, failure of those services will have an adverse effect on the ability of an entity, such as a business, to continue operations.

One of biggest benefits of cloud computing is that customers, by virtue data center employment, no longer have to worry about the availability of data and code. At the same time, hardware and various other elements inside of data centers clearly have reliability limits and failures can occur. The expectation is that regardless of these failures cloud service providers will be able to run applications and protect data in any case. Mechanisms are already in place when it comes to failure of individual components of a data center, for example, when a server fails. However, there are types of failures or distributive events that could affect an entire data center. For example, natural disasters, catastrophic human errors, or malicious acts could result in a massive failure of a data center. Such a massive failure would result in application and data unavailability for a period of time while a cloud service provider repairs the facility.

In order to guarantee availability of applications and data even in cases of a massive data center failure, redundant copies can be maintained at a separate facility. A primary data center can be selected to host applications and data, and a secondary data center can be identified as a backup, wherein the primary and secondary data centers are in different geographical regions. If the primary data center suffers a massive failure and an application and database are no longer accessible, there is a process called fail over in which the secondary data center can be activated to provide access to the application and database on the secondary data center. To support such a disaster recovery scenario, the service provider replicates data between the primary and secondary data centers. Nevertheless, data can be lost in case of data center failure, because of the distance between data centers located in different regions. The distance causes a lag between transactions committed on a primary database and transactions committed on a secondary database, for instance. When a failure occurs, not all data committed on the primary database will have been committed on the secondary database. Consequently, data is lost after fail over.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to recovery-point-objective enforcement. A recovery point objective defines the maximum acceptable data loss in case of disruptive event and subsequent fail over. Further, potential data loss can be capped. To enforce an upper limit on the amount of data loss, lag can be monitored as data is replicated from a primary store to a secondary store. Moreover, activity on the primary store can be throttled as a function of the lag and a maximum lag corresponding to a recovery point objective. If a data change to the primary source is aborted as a result of throttling, an error message can be spawned indicating at least as much. Further, current lag amongst other data can be made available to enable at least compliance monitoring. Still further yet, resources can be allocated at least as a function of the maximum lag.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

A cloud-based application can have a service level agreement (SLA) that defines a limit of potential data loss in the case of wide spread loss of facilitates caused by natural disasters, catastrophic human errors, or malicious acts, for example. Since application vendors or developers may be liable if data loss exceeds the limits defined by the SLA, a mechanism to limit the potential loss can be offered by a cloud service provider with respect to a data source that the application depends on for its state (e.g., relational database, table store . . . ). Conventionally, a log shipping mechanism is employed, wherein log files are collected and sent at a scheduled interval to a backup data center. A downside of this approach is that data loss is equal to the interval. Other solutions that employ asynchronous replication do not provide any guarantees regarding data loss and simply employ what is called best effort replication. Here, however, there are situations in which data loss can exceed a maximum. By way of example, in a situation in which there is a high transaction rate combined with intermittent loss of connectivity, data loss can be significant and in excess of a maximum defined by the SLA.

Details below are generally directed toward enforcement of a recovery point objective (RPO) for disaster recovery. The RPO defines the maximum amount of data that can be lost on fully recovering from a disruptive event such as a disastrous failure. RPO is typically specified in in service level agreement between an application vendor or developer and its customers. A service provider that hosts such an application can provide a mechanism to bound potential data loss by specifying a maximum lag between the times when data changes on a source and when the changes are synchronized on the replica. Lag can be monitored during data replication, and incoming transactions corresponding to data creation, modification, or deletion, for example, can be throttled as a function of the lag and the maximum lag. Throttling, in one instance, can correspond to aborting incoming transactions when the maximum lag is reached. Additionally or alternatively, the speed at which the incoming transactions are accepted or committed on a source can be reduced as lag is approaching the maximum lag to provide a graceful slowdown and minimize situations when transactions are aborted. If a transaction is aborted, an error message can be spawned indicating that the transaction was aborted because the current lag has exceeded a configured maximum. Further, current lag among other data can be provided in response to a request therefor, for instance, to enable at least compliance monitoring. Still further yet, resources, such as bandwidth, can be allocated at least as a function of the maximum lag Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
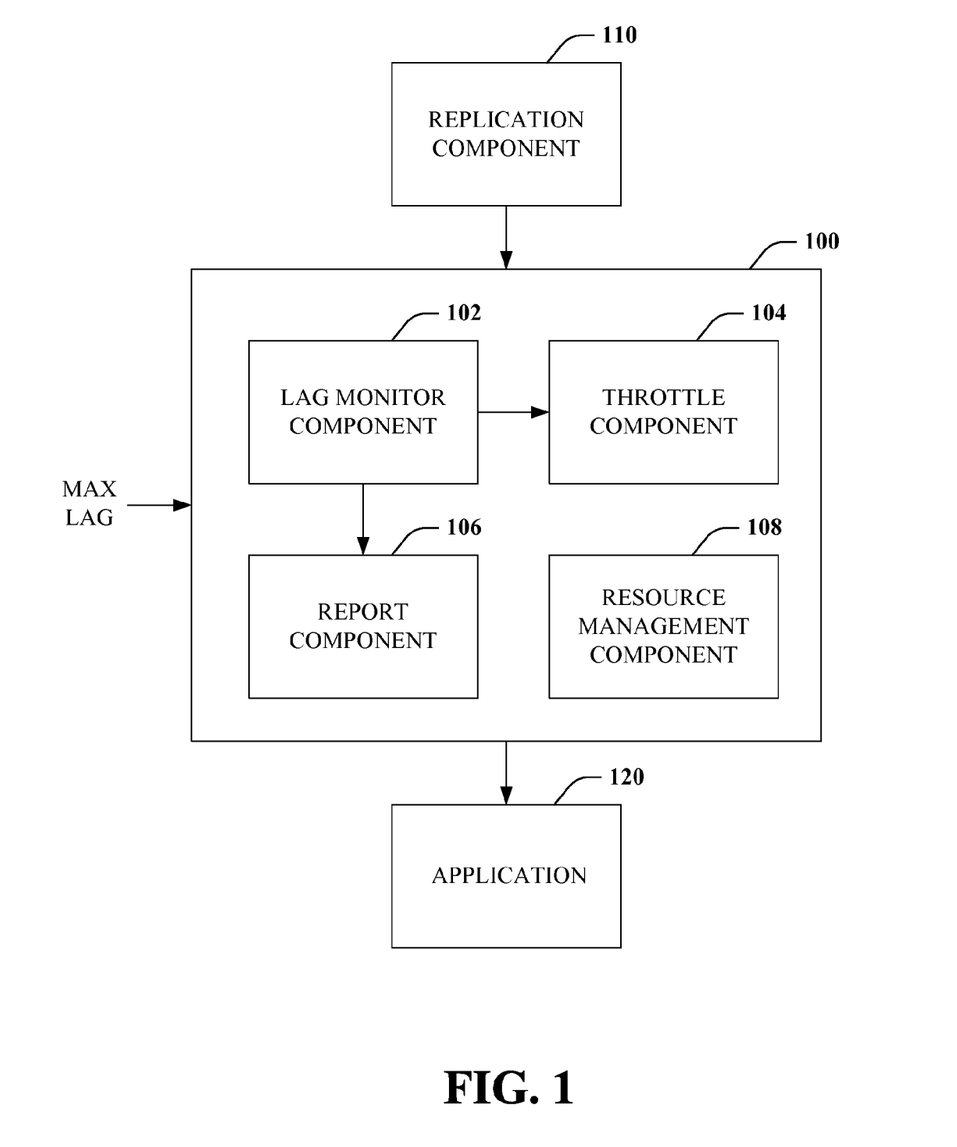
FIG. 1 is a block diagram of a data-loss limitation system.

Referring initially to FIG. 1, data-loss-limitation system 100 is illustrated. The system 100 can be employed in conjunction with data replication provided by the replication component 110. In other words, the replication component 110 is configured to automatically replicate data or changes thereto across sources. In accordance with one embodiment, the replication component 110 can be configured to perform continuous and asynchronous data replication. Stated differently, changes to an active source (a store that is open for full application access (e.g., read-write transactions)) can be continuously copied to a replica (a redundant store) as changes occur in what can also be termed a continuous copy relationship. In this instance, there is no delay associated with collecting or batching changes and subsequently sending collections at scheduled intervals.

The system 100 can accept as input a value of maximum lag. More particularly, application developer can specify the maximum lag in conjunction with a data replication, which can correspond to a recovery point objective in a service level agreement with an application customer. The recovery point objective defines how much data loss a customer (e.g., individual, business, organization . . . ) will tolerate in case of a disastrous failure that disrupts normal function, for example, where there is a data center outage. The RPO can be expressed in terms of time such as seconds, minutes, or hours, for example. An RPO of one hour, for instance, means loss of an hour worth of changes to a source is the maximum acceptable data loss upon disaster recovery. If given a service level agreement it is desired to ensure that the RPO is not violated, a corresponding maximum lag can be specified (e.g., in minutes) in conjunction with data replication.

Lag monitor component 102 is configured to determine and track the maximum difference between a source and one or more target replicas in terms of time (e.g., minutes, hours . . . ). This can be accomplished by keeping track of the lag between changes made on a source and synchronization of the changes on a replica.

A transaction is a unit of work performed against a data store that is atomic, consistent, isolated, and durable. A transaction can include operations that create, retrieve, modify, or delete data. Once a transaction is committed on a data store, the transaction is permanent and acknowledgement thereof can be provided. In the context of transactions, the lag component 102 can keep track of the oldest transaction to commit on the source but not on a replica (acknowledgement was not received from the replica). Stated yet another way, maximum unacknowledged time can be monitored.

Throttle component 104 is configured to throttle activity of an application 120 automatically as a function of current lag, as provided by the lag monitor component 102, and the maximum lag. In other words, lag can be compared to maximum lag and throttling performed based thereon. The throttle component 104 can be configured to operate in one or more different modes.

In accordance with one embodiment, the throttle component 104 is binary Based on the current lag and maximum lag, the application 120 is either throttled or not. For example, if the lag exceeds the maximum lag, the application is throttled. Otherwise, the application is operates without throttling. In one instance, a throttled application can be prohibited from accepting data or transactions. Additionally or alternatively, a throttled application can prevent data from being saved or a transaction from being committed on a local source. By halting data or transactions from being processed, additional time is provided to allow a replica to catch up with the state of a source and lag to be reduced to an acceptable range. If the application 120 is throttled, an error message can be spawned through the application indicating to a user that the application is not accepting new transactions or that a transaction will not be committed, for example, because the current lag is greater than that the permitted based on a configurable maximum lag.

According to another embodiment, the throttle component 104 can be configured to reduce the speed at which the application 120 can accept incoming transactions as a function of the current lag and maximum lag. As opposed to denying the users the ability to deposit new data, the throttle component 104 can slow acceptance of transactions down to allow a replica to catch up with the state of a source. For example, the application 120 can be slowed down as the current lag approaches the maximum lag. Further, the slowdown can be variable such that the extent to which activity of the application 120 is slowed down depends on how close the current lag is to the maximum. Further yet, the pace at which lagging is increasing for example can be considered by the throttle component 104 in determining a slowdown rate. For example, if lag is increasing rapidly the throttle component 104 can provide a corresponding degree of slowdown.

A hybrid configuration can also be employed by the throttle component 104. For instance, application slowdown can be employed up to a point. At that point, additional data or transactions will not be accepted at all. As lag decreases, the application can be allowed to accept transactions at a reduced speed until lag decreases to a threshold at which time throttling can be terminated.

Report component 106 is configured to output data regarding the system 100, for instance in response to a user request. In one instance, the report component 106 can provide an indication that the system 100 is active. Further, the report component 106 can output the current lag. The maximum lag is a limit or upper boundary. However, if the maximum lag is thirty minutes, for example, that does not mean that at any given point the actual or current lag is thirty minutes. Rather, the lag is likely to be few seconds. Making the lag obtainable enables a user to confirm that the system 100 is operating as expected.

Resource management component 108 is configured to control allocation of resources automatically as a function of the maximum lag. In particular, communication bandwidth can be allocated based thereon. For instance, if amount of data loss that can be tolerated is small (e.g., five minutes), the resource management component 108 can allocate or initiate allocation of isolated or dedicated bandwidth between a source and a replica. Consequently, the amount of lag will be smaller than it otherwise would be since there will be no competition for resources with others. Furthermore, the resource management component 108 can be configured to dynamically change resource allocation based on runtime performance. By way of example, more resources can be provided temporarily when lag approaches the maximum lag to help a replica catch up.

Among other things, the system 100 enables a tradeoff between data loss and availability. In some situations, applications are highly sensitive to data loss. The system 100 provides a mechanism to cap data loss. Moreover, in most cases availability and performance are not negatively impacted, except in the case when the chance is high that data loss will exceed a maximum. In this case, data transactions can be halted or slowed down in order to ensure that more data will not be lost than can be afforded. Further, dedicated bandwidth can be employed ensure data loss does not exceed a cap as well as improve performance by reducing the likelihood of throttling.

Figure 2:
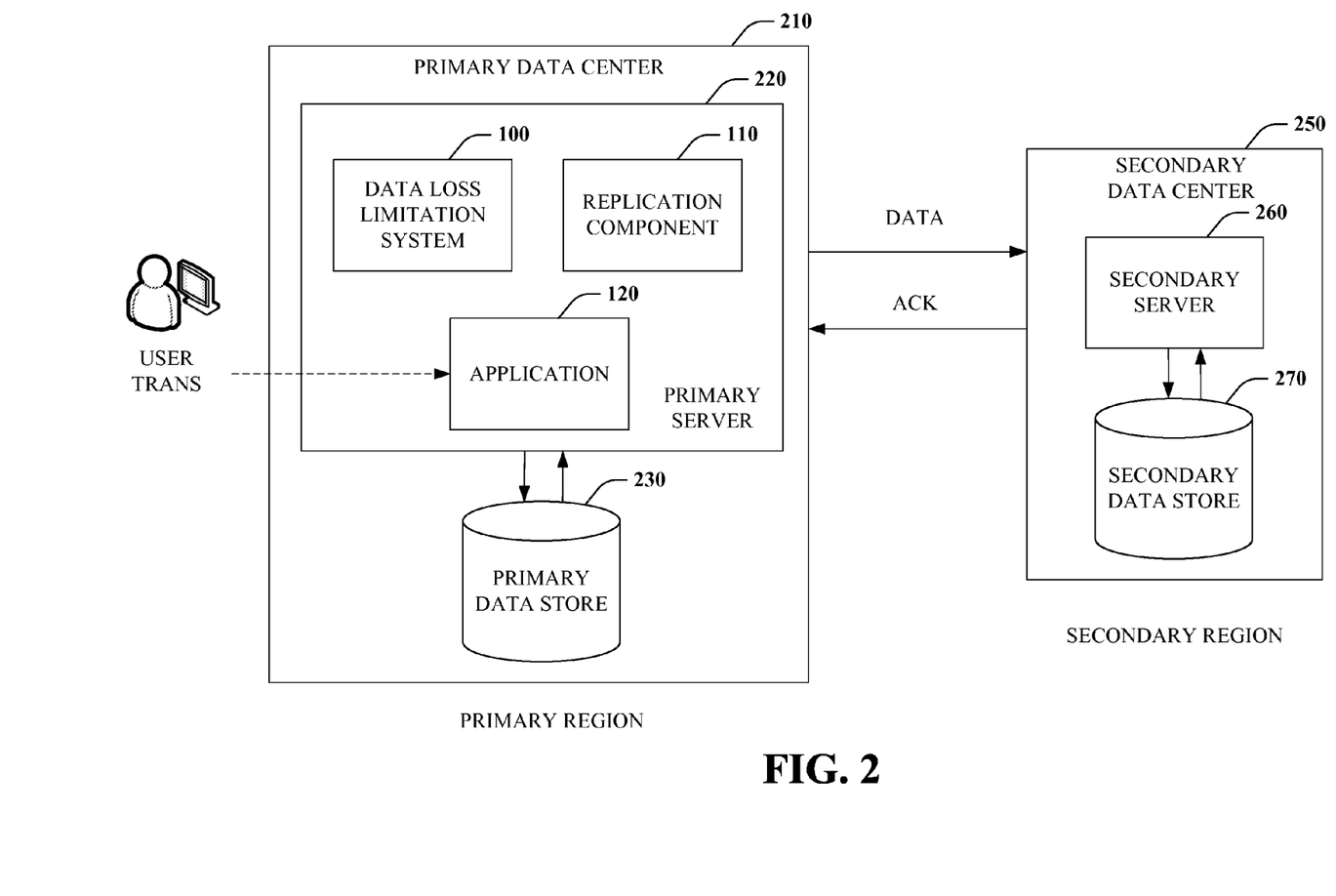
FIG. 2 is a block diagram of an exemplary execution environment for the data-loss limitation system.

FIG. 2 depicts an exemplary concrete environment in which the system can be employed. As shown, there are two data centers, namely primary data center 210 and secondary data center 250. The primary data center 210 is located in a primary region and the secondary data center 250 is located in a secondary region. The primary and secondary regions are different and distant geographic regions, or, in other words, disaster recovery sites. For instance, geographic regions can correspond to countries or states within countries. As non-limiting examples, the primary data center 210 could be located in the United States while the secondary data center 250 could be located in Canada or the primary data center 210 could be located in Texas while the secondary data center 250 could be located in Illinois. Such cross-region redundancy enables recovery from a temporary outage or even the permanent loss of a data center caused by natural disasters, catastrophic human errors, or malicious acts. Such events, though rare, can be devastating. For example, consider a scenario in which the entire primary data center 210 is flooded. Even if the primary data center 210 is intact, an application and data could be inaccessible for days, which can be detrimental to business continuity.

The primary data center 210 includes primary server 220 and primary data store 230, and the secondary data center 250 includes secondary server 260 and secondary data store 270. The primary data source 230 and secondary data store 270 are non-volatile storage media that house persistent data. In one instance, the primary data store 230 and the secondary data store 270 can correspond to a database that stores application data, or, in other words, data that an application depends on for its state.

The primary server 220 and secondary server 260 are physical computers that execute services and provide data to other computers connected thereto over a network such as the Internet. As shown, the primary server 220 hosts the application 120 (as a service) that accepts and processes transactions from one or more users. The application 120 can be embodied as a cloud-based service with data saved in the primary data store 230.

The replication component 110 can also be executed on the primary server 220 to replication data from the primary data store to the second data store continuously and asynchronously. Accordingly, once a data transaction commits, or executes successfully in its entirety, on the primary data source 230 the transaction is transmitted and replicated on the secondary data source. There is no delay associated with batching transactions and sending batches at scheduled intervals. If the transaction successfully executes in its entirety on the secondary data store 270, or, in other words, commits, an acknowledgment can be sent to the replication component 110 indicating that the transaction committed and providing the commit time on the secondary data store 270.

The data-loss limitation system 100 can be communicatively coupled to, or integrated within, the replication component 110 and application 120. The system 100 can keep track of the difference between the primary data store 230 and the secondary data store 270. More specifically, the system 100 can monitor lag between the two stores based on commit times and throttle the application 120 as needed to ensure that any potential data loss does not exceed a configured maximum. Throttling can correspond to preventing the application from accepting incoming transactions and/or preventing accepted transactions from committing on the primary data store 230. Additionally or alternatively, throttling can be accomplished by reducing the speed at which transactions are accepted and/or committed. In either case, additional time is afforded for queued transactions to commit on the secondary data store 270.

Although not shown, the secondary server 260 can include a copy of the application 120 or be able to load the application from a store such as the secondary data store 270. In any event, if an communication interlink between data centers is lost, there is prolonged loss of connectivity to the primary store, or there is a data center wide outage in a region, a decision can be made to fail over to the secondary data center 250 and associated secondary data store 270. In other words, the secondary data center 250 can be activated as the new primary data center and transactions can be directed thereto. In this case, data loss can occur since some data transactions committed on the primary data store 230 may not have been replicated to the secondary data store 270. Nevertheless, due to throttling the data loss will be capped.

FIG. 2 illustrates a simplified environment to facilitate clarity and understanding with respect to various disclosed aspects. The claimed subject matter is not limited thereto. For example, here only one replica is disclosed. However, it is to be appreciated that the functionality described herein can be extended to situations in which two or more replicas exist.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the data-loss limitation system 100 can employ such mechanisms to determine or infer that lag will exceed a maximum and proactively initiate throttling of application activity. For instance based on the time of year, date, day of week, or time of day, it can be inferred a larger than normal amount of data will be acquired rapidly. In this situation, throttling can be initiated to slowdown processing to ensure that a specified RPO is not violated.

Figure 3:
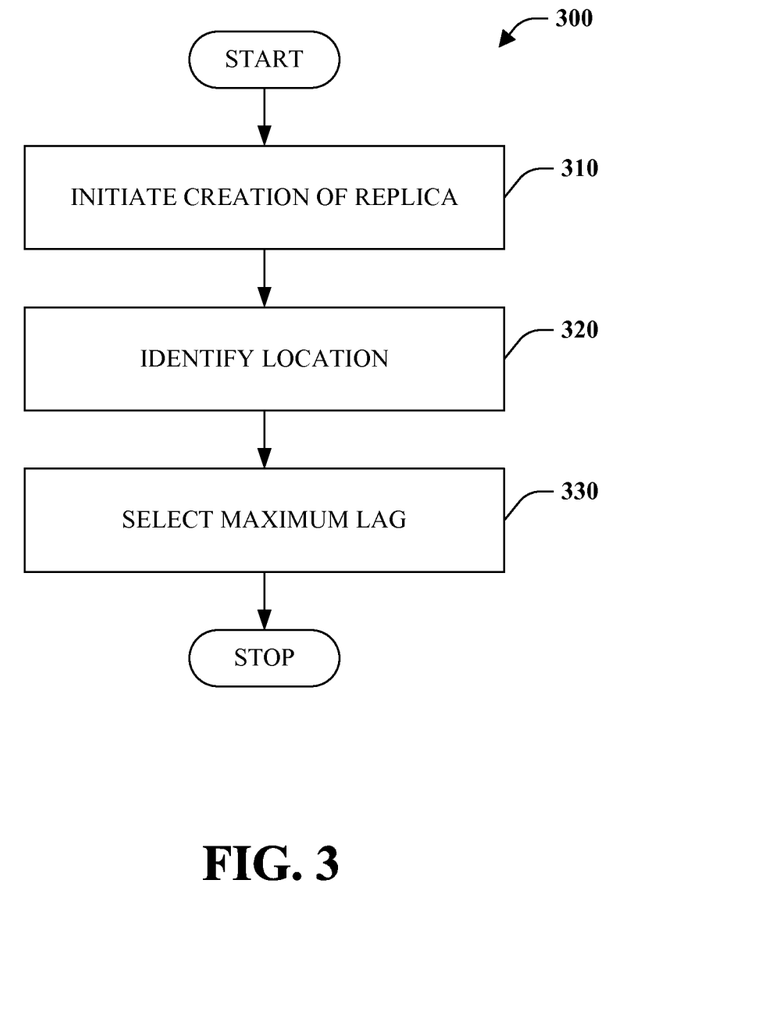
FIG. 3 is a flow chart diagram of a method of configuration.
Figure 4:
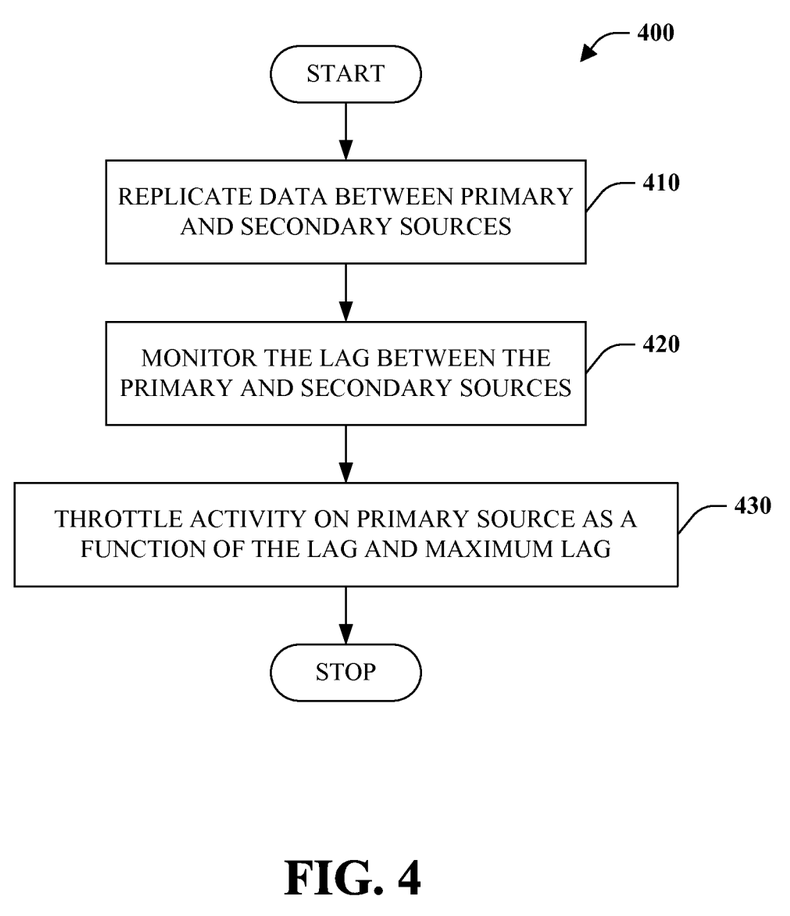
FIG. 4 is a flow chart diagram of a method of maximum lag enforcement.
Figure 5:
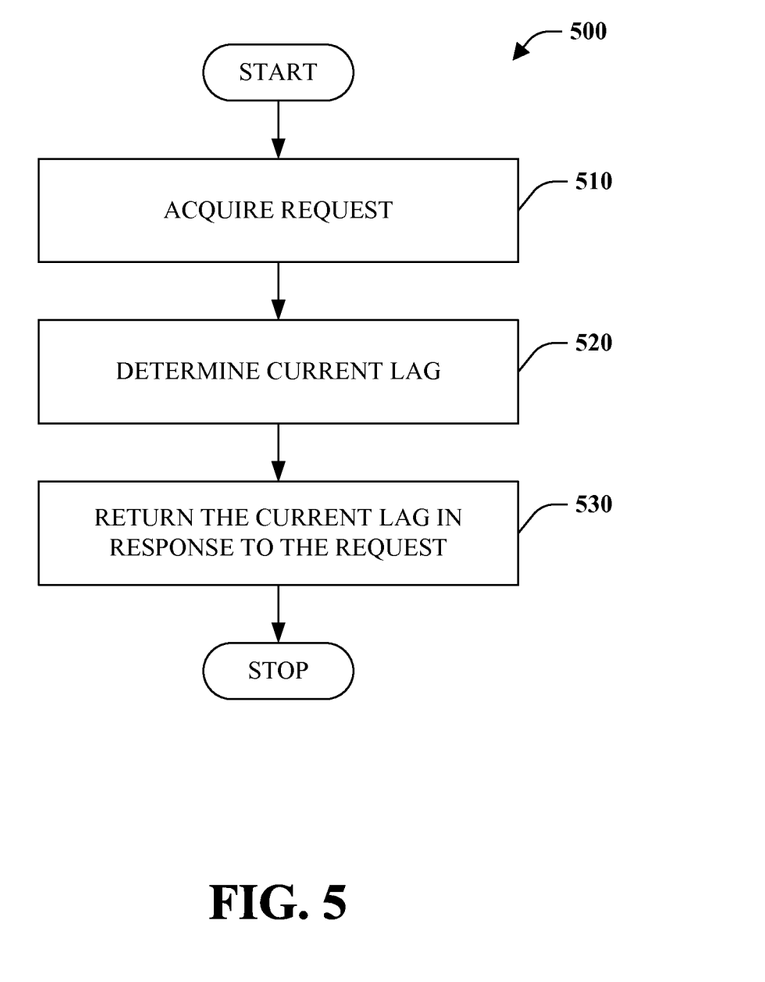
FIG. 5 is a flow chart diagram of a method of data acquisition.

In view of the exemplary systems described above, methodologies that may be implemented in accordance with the disclosed subject matter will be better appreciated with reference to the flow charts of FIGS. 3-5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 3, a configuration method 300 is illustrated. At numeral 310 creation of a replica can be initiated, for example as part of configuring an application hosted by a cloud service provider. At numeral 320, a location can be identified for the replica. The location can be a different and distant geographic region with respect to a primary data source such that a disruptive event such as a natural disaster (e.g., tsunami, hurricane, tornado, earthquake . . . ) is unlikely to affect both the primary and replica, for instance. At reference numeral 330, a maximum lag between the primary and replica can be selected or otherwise specified. In one instance, the maximum lag can be selected based on an RPO in a service level agreement. By way of example and not limitation, the lag can be specified between five minutes and twenty-four hours.

FIG. 4 illustrates a method 400 of maximum lag enforcement. At reference numeral 410, data or changes thereto are replicated between a primary data source and a secondary data source. Replication can be continuous and asynchronous. Stated differently, changes can be continuously copied from source data store that has active transactions to a communicatively coupled replica data store as changes are occur. At numeral 420, lag between the primary and secondary sources is monitored. In one instance, the oldest unacknowledged transaction can be tracked, wherein an unacknowledged transaction is one that has committed on the source data store but acknowledgement that the transaction committed on the secondary data source has not been received. Here, oldest can refer to the largest difference between commit time on the source and the current time. At 430, activity on the primary source can be throttled as a function of the lag and a maximum lag. For instance, if the current lag between a primary source and a replica is exceeds the maximum lag, incoming transactions can be rejected and/or prevented from committing on the primary source. In another instance, the speed at which data transactions are accepted and/or processed can be reduced as lag approaches the maximum. For example, an applications ability to accept and process transactions can be slowed at an increasing rate such that operation of the application is halted when the lag reaches the maximum allowable. This allows a replica time to commit data transactions and reduce the lag at which point throttling can be reduced or terminated.

FIG. 5 is a flow chart diagram of method 500 of data acquisition. At numeral 510, a request of the current lag between a source and a replica is received, retrieved, or otherwise obtained or acquired. At reference 520, current lag is determined by locating a pre-computed value or computing the difference between the current time and the oldest data transaction committed on the source from which acknowledgement that the transaction committed on the replica has not been received. At reference numeral 530, the current lag can be returned in response to the request. This enables confirmation a system is operating properly in enforcing the maximum lag. Additional information could also be returned with the current lag including information indicative of whether or not throttling is being performed and potentially the rate of throttling.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the terms "component," and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
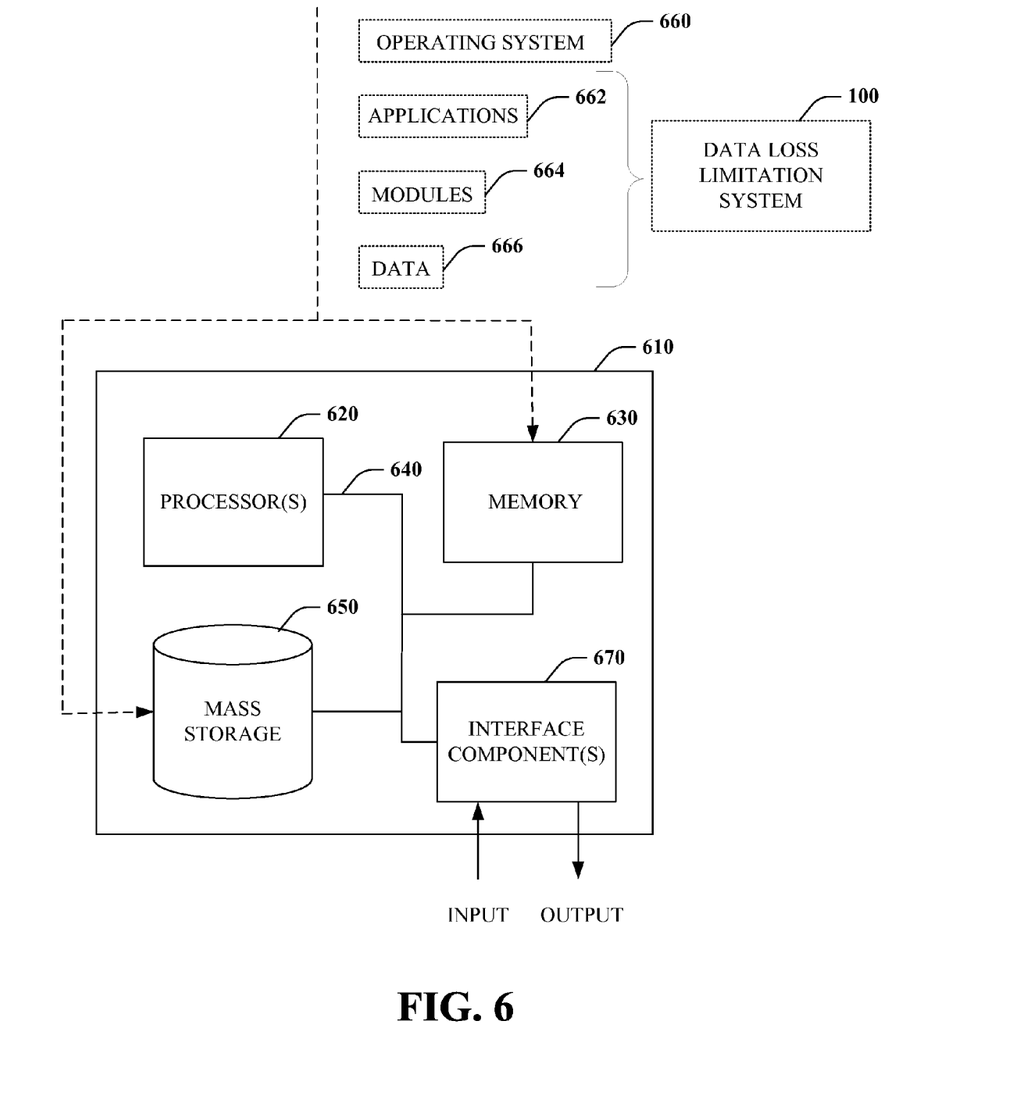
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, tablet, server, hand-held, programmable consumer or industrial electronics, set-top box, game system, compute node . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. Computer-readable media can comprise computer storage media and communication media.

Computer storage media includes volatile and nonvolatile, removable and non-removable media implemented in any method or technology for storage of information such as computer-readable instructions, data structures, program modules, or other data. Computer storage media includes memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums which can be used to store the desired information and which can be accessed by the computer 610. Furthermore, computer storage media excludes modulated data signals.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the data-loss limitation system 100, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the data-loss limitation system 100 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, LED, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of coordinating transactions committed at a primary data store with a secondary data store, the method involving a device having a processor and comprising:
   executing, by the processor, instructions that cause the device to:
      store a service level agreement identifying a data loss tolerance of data stored by the primary data store and not the secondary data store;
      for respective transactions committed by the primary data store, measure a synchronization lag as a duration between a transaction commit of committed data of the transaction to the primary data store, and synchronization of the committed data stored by the primary data store with the secondary data store;
      based upon the synchronization lag between the transaction commit of the committed data and synchronizing the committed data to the secondary data store, estimate a current data loss potential; and
      on condition of the current data loss potential exceeding the data loss tolerance specified by the service level agreement, throttle a transaction count of unsynchronized transactions pending at the primary data store until the current data loss potential no longer exceeds the data loss tolerance.

2. The method of claim 1, wherein throttling the transactions on the primary data store further comprises: responsive to a request to commit a transaction at the primary data store, abort the transaction rather than committing the transaction.

3. The method of claim 1, wherein throttling the transactions on the primary data store further comprises: reducing a speed at which incoming transactions are committed at the primary data store.

4. The method of claim 3, wherein reducing the speed at which incoming transactions are committed at the primary data store further comprises:
   comparing the current data loss potential to the data loss tolerance to determine a proximity of the synchronization lag to a synchronization lag maximum beyond which the current data loss potential exceeds the data loss tolerance; and
   reducing the speed at which incoming transactions are committed proportionally with the proximity of the synchronization lag to the synchronization lag maximum.

5. The method of claim 3, wherein reducing the speed at which incoming transactions are committed at the primary data store further comprises:
   comparing the current data loss potential to the data loss tolerance to determine a lag rate at which the synchronization lag is approaching a synchronization lag maximum beyond which the current data loss potential exceeds the data loss tolerance; and
   reducing the speed at which incoming transactions are committed proportionally with the lag rate at which the synchronization lag is approaching the synchronization lag maximum.

6. The method of claim 1, wherein throttling the transactions on the primary data store further comprises: reducing a transaction initiation rate at which incoming transactions are initiated at the primary data store.

7. The method of claim 1, wherein:
the secondary data store transmits an acknowledgment of completing synchronizing of the committed data for respective transactions; and
measuring the synchronization lag further comprises: measuring the synchronization lag as an age of a longest-pending transaction commit for which the secondary data store has not transmitted an acknowledgment of completing synchronization of the committed data for the longest-pending transaction commit.

8. The method of claim 1, wherein throttling the transactions on the primary data store further comprises: rejecting, rather than accepting, incoming transactions received by the primary data store.

9. The method of claim 1, wherein throttling the transactions on the primary data store further comprises: reducing a speed at which pending transactions are processed at the primary data store.

10. The method of claim 1, wherein:
synchronizing the primary data store with the secondary data store further comprises: synchronizing the committed data stored by the primary data store with the secondary data store over a network, wherein synchronizing over the network consumes network capacity at a network bandwidth; and
executing the instructions further causes the device to allocate network bandwidth proportionally to the data loss tolerance of data stored by the primary data store and not the secondary data store.

11. The method of claim 1, wherein reducing the speed at which incoming transactions are committed at the primary data store further comprises: on condition of the current data loss potential exceeding the data loss tolerance, incrementally reducing the speed at which incoming transactions are committed at the primary data store.

12. The method of claim 1, wherein:
synchronizing the primary data store with the secondary data store further comprises: synchronizing the committed data stored by the primary data store with the secondary data store over a network, wherein synchronizing over the network consumes network capacity at a network bandwidth; and
executing the instructions further causes the device to, responsive to determining that the synchronization lag is approaching a synchronization lag maximum beyond which the current data loss potential exceeds the data loss tolerance, increase a network bandwidth allocation between the primary data store and the secondary data store.

13. The method of claim 1, wherein:
the transactions are committed by the primary data store on behalf of an application exhibiting a data loss sensitivity; and
estimating the current data loss potential further comprises: estimating the current data loss potential according to the data loss sensitivity of the application.

14. The method of claim 1, wherein estimating the data current data loss potential further comprises:
estimating a data acquisition rate of the primary data store resulting from committing the transactions; and
estimating the current data loss potential according to the lag and the data acquisition rate of the primary data store.

15. The method of claim 14, wherein:
the transactions are committed by the primary data store on behalf of an application; and
estimating the data acquisition rate further comprises: estimating the data acquisition rate of the application based upon a chronology factor selected from a chronology factor set comprising:
a current time of year;
a current date;
a current day of week; and
a current time of day.

16. The method of claim 1, wherein:
the transactions are committed by the primary data store on behalf of an application; and
executing the instructions further causes the device to, responsive to detecting a failure of the primary data store, initiate a failover of the application from the primary data store to the secondary data store.

17. A system for coordinating transactions committed at a primary data store with a secondary data store, the system comprising:
a service level agreement that identifies a data loss tolerance of data stored by the primary data store and not the secondary data store;
a transaction monitor that:
for respective transactions committed by the primary data store, measure a synchronization lag as a duration between a transaction commit of committed data of the transaction to the primary data store, and synchronization of the committed data stored by the primary data store with the secondary data store; and
based upon the synchronization lag between the transaction commit of the committed data and synchronizing the committed data to the secondary data store, estimate a current data loss potential; and
a transaction throttle that:
performs a comparison of the current data loss potential to the data loss tolerance:
chooses a transaction throttling rate based on the comparison; and
throttles a transaction count of transactions pending at the primary data source according to the transaction throttling rate.

18. The system of claim 17, wherein choosing the transaction throttling rate based on the comparison further comprises:
determining that the current data loss potential is approaching and has not yet exceeded the data loss tolerance; and
choosing a positive transaction throttling rate, to apply to the transactions at the primary data source while the current data loss potential has not yet exceeded the data loss tolerance, to prevent the current data loss potential from exceeding the data loss tolerance.

19. The system of claim 18, wherein choosing the positive transaction throttling rate, while the current data loss potential has not yet exceeded the data loss tolerance, further comprises: choosing the positive transaction throttling rate proportional to a proximity of the current data loss potential to the data loss tolerance.

20. A computer-readable storage medium having instructions stored thereon that enable at least one processor of a device to coordinate transactions committed at a primary data store with a secondary data store, by:
storing a service level agreement identifying a data loss tolerance of data stored by the primary data store and not the secondary data store;

for respective transactions committed by the primary data store, measuring a synchronization lag as a duration between a transaction commit of committed data of the transaction to the primary data source, and synchronization of the committed data stored by the primary data store with the secondary data source;

based upon the synchronization lag between the transaction commit of the committed data and synchronizing the committed data to the secondary data store, estimate a current data loss potential of data; and on condition of the current data loss potential exceeding the data loss tolerance specified by the service level agreement, throttling a transaction count of transactions at the primary data source pending at the primary data store.

* * * * *